Oct. 3, 1967    L. GIDGE ETAL    3,345,232
METHOD AND APPARATUS FOR MAKING CRISS-CROSS MATERIAL
Filed Feb. 17, 1966    4 Sheets-Sheet 3

INVENTOR.
LESTER GIDGE
VALMOR R. POULIN, Jr.
BY
Pearson & Pearson
ATTORNEYS

Oct. 3, 1967 L. GIDGE ETAL 3,345,232
METHOD AND APPARATUS FOR MAKING CRISS-CROSS MATERIAL
Filed Feb. 17, 1966 4 Sheets-Sheet 4

INVENTOR.
LESTER GIDGE
VALMOR R. POULIN, Jr.
BY
Pearson + Pearson
ATTORNEYS

United States Patent Office 3,345,232
Patented Oct. 3, 1967

3,345,232
METHOD AND APPARATUS FOR MAKING CRISS-CROSS MATERIAL
Lester Gidge and Valmor R. Poulin, Jr., Nashua, N.H., assignors to Union Carbide Corporation, a corporation of New York
Filed Feb. 17, 1966, Ser. No. 528,191
15 Claims. (Cl. 156—181)

This invention relates to an improved machine and method for continuously producing a criss-cross, non-woven netting at relatively high speed.

It has heretofore been proposed, as in U.S. Patent No. 1,211,851 to Howard of Jan. 19, 1917, to advance a pair of rows of upstanding pins in vertical planes and to swing a plurality of guide tubes in a rectilinear horizontal plane laterally from outside of one row to outside of the other row, the plane being above the level of the tips of the pins. To loop the strands, delivered by the tubes, alternately around the pins of the pin-carriers, a section of the pin-carrier was periodically raised above the normal level of the tips thereof to intercept the strands on their inward lateral path.

Subsequently, in U.S. Patent No. 2,812,797, to Estee of Nov. 12, 1957, it was proposed to maintain the pins at their normal level, but to swing the guide tubes in a curvilinear plane laterally from outside of one row to outside of the other row. To loop the strands delivered by the tubes, alternately around the pins, the looping mechanism caused the guide tubes to dip downwardly at each opposite end of the stroke to below the level of the pin tips so that the pins intercepted the strands on their inward lateral path.

In our U.S. patent application, Ser. No. 349,931, filed Mar. 6, 1964, a netting machine is disclosed in which the rows of pin-carriers travel in horizontal planes, so that the looping stroke can be relatively short and fast with the rows of pins later being spread apart to widen the netting to the desired width. In the embodiment illustrated therein, the short stroke of the looping mechanism is along a single curvilinear, lateral plane which is below the level of the tips of the pins at the opposite ends thereof to enable the guide tubes to pass outwardly between the pins and back inwardly between the pins. The looping member of our said application is unitary and pivoted on an axis below the longitudinal centre line of the rows of pins, the entire unitary member also reciprocating longitudinally to accompany the advancing pins during looping and to retract during the central portion of the lateral stroke.

It will be understood that in forming a criss-cross netting by means of a short stroke between rapidly advancing rows of pins spaced, for example, about six inches apart, and then spreading the rows of pins carrying the strands to, for example, six feet apart, there is considerable tension on the strands which are being pulled around the diverging pins and through the guide tubes all the way back to the strand packages. In addition, at high speed, short stroke operation, wherein the entire mass of the looping member is being pivoted back and forth laterally as well as reciprocated back and fourth longitudinally twice in each pivot stroke, the strand guide tubes impart varying impacts on the strands, due to repeated abrupt changes of direction, which may induce breakage of fragile strands already subject to tension.

In this invention, therefore, a multi-part looping member is provided wherein a relatively massive cradle, pivoted below the pins, carries a relatively light longitudinally reciprocable carriage and the guide tube support is pivotally mounted on the carriage above the path of the pins to move the ends of the guide tubes through the pins at each opposite end of the lateral stroke of the member. The path of the delivery ends of the guide tubes is thus an arc of a circle around the lower axis plus a pair of secondary arcs of a circle, each at an opposite side of the stroke and each around the upper axis of the guide support. The cradle, carriage and guide support are so synchronized as to cause the carriage and guide tubes to be advancing with the pins sat each opposite side of the cradle stroke and to cause the guide tubes to pivot out and back through the pins, while advancing with the pins, thereby cushioning any impact of the guide tubes on the strands and avoiding abrupt direction changes. The invention also includes the provision of automatic feed means to feed the multiple strands from the strand packages to the looping member, thereby counteracting the tension and draft exerted on the strands by the rapidly advancing and spreading rows of pins. Preferably this is accomplished by encircling each strand in a flexible tube and applying air pressure to the tube, thereby not only initially threading the looping member but continuously blowing each strand, in the direction of feed, toward the looping member.

The principal object of the invention therefore is to provide improved looping mechanism in a netting machine for achieving high speed, short stroke looping while cushioning the effect of the strand guides on the strands passing therethrough.

Another object of the invention is to provide feed means between the strand supply and the looping member of a netting machine, to counteract the tension exerted on the strands by rapidly advancing and spreading rows of pins upon which netting has been formed.

A further object of the invention is to provide looping mechanism in a netting machine in which the delivery ends of the strand guide tubes travel in a first arcuate path above the level of the tips of the carrier pins in the centre but below that level at each opposite side of the path and travel in a second arcuate path below the level of the tips of the pins at each opposite side of the first path, to pass between, loop around, and pass back between the pins.

Other objects and advantages of the invention will be apparent from the claims, the description of the drawings, and from the drawings, in which:

Figure 1:
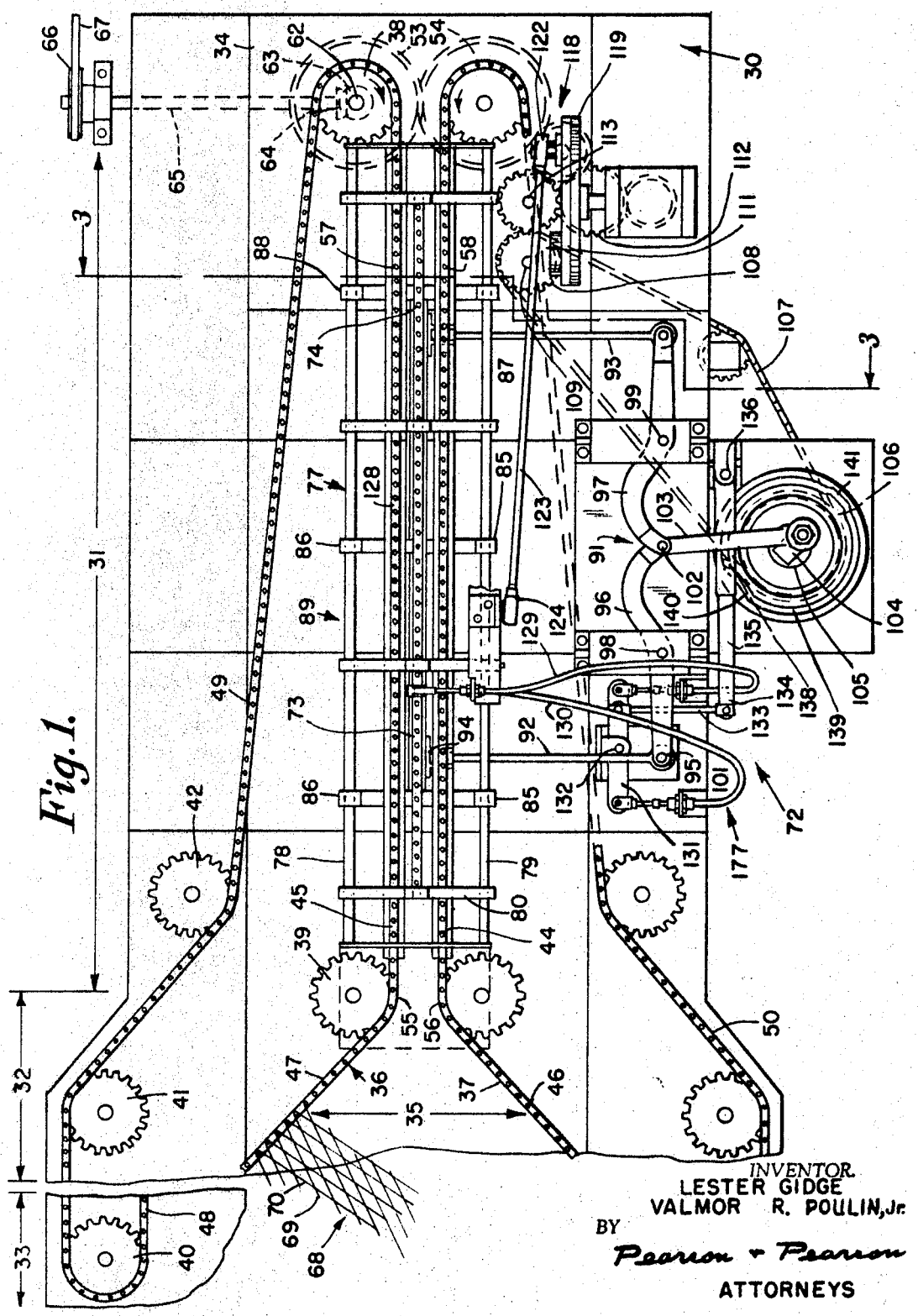
FIGURE 1 is a plan view of the apparatus of the invention.

The machine 30 of the invention includes the looping zone 31, the network spreading zone 32, and the zone 33, which latter zone may be for sheet laminating, stripping or other purposes, all as explained in detail in my said co-pending application, and as now known in the art. For example, following the spreading zone, 32, the criss-cross filaments may be fused or adhered at their crossing points to provide a non-woven netting. The frame 34, of machine 30, supports the endless carrier means 35, which is in the form of a pair of endless link chains 36 and 37, each trained on sprockets such as 38, 39, 40, 41 and 42, the sprockets being rotatable in horizontal planes on vertical axes in suitable bearings. The chains 36 and 37 form a pair of closely spaced, parallel stretches 44 and 45, about four to ten inches apart, in the looping zone 31, a pair of divergent stretches 46 and 47, in the network spreading zone 32, and a pair of widely spaced, parallel stretches, such as at 48 in the zone 33, about four to ten feet apart, these also being return stretches 49 and 50.

The chain stretches advance unidirectionally through zones 31, 32 and 33, by reason of the intermeshed drive gears 53 and 54, each rotating one of the sprockets, such as 38, of each chain, and causing the oppositely disposed chain links, such as 55 and 56, to travel in synchronization with each other at a predetermined speed.

Mounted at spaced, equal distances, along each chain, usually three to a link, are a plurality of slightly hooked, upstanding, loop-receiving elements, or pins, 57 or 58. Each pin has a portion 59, intermediate of its height, which is bent or curved inwardly toward the pins on the opposite stretch (FIGURE 4) and has a terminal tip portion 61 bent away from the opposite pins.

The gear 53 is fast to a vertical shaft 62, which carries the bevel gear 63, bevel gear 63 being meshed with bevel gear 64, rotated by horizontal shaft 65, the latter being rotated by pulley 66 and belt 67, or by any other suitable source of power. (FIGURE 1).

As thus far described, the endless carrier means 35, divergent stretches 46 and 47, etc., are similar to the corresponding parts of my co-pending application. The crisscross, open-work netting 68, formed by the multiple strands, such as 69 and 70, and looped back and forth around the pins, is also similar to the product described in the said application.

The capability of the machine of my co-pending application to loop multiple strands first around the upstanding pins on one side and then around the upstanding pins on the other side, in relatively short rapid strokes, and then to spread out the resulting netting to a much increased width, is greatly enhanced by the improved looping mechanism and strand feed mechanism described hereinafter.

As shown, the improved multiple strand looping mechanism 72, of this invention, is mounted in the looping zone 31 and is of multiple parts, rather than unitary, as in my said co-pending application. Mechanism 72 includes the guide support 73 which extends substantially the full length of the looping zone, is parallelism with the longitudinal paths of the stretches 44 and 45 of the pin carrier mechanism, and, for example, may be six to eight feet in length. Guide support 73 carries a multiplicity of individual tubular strand feed guides 74 equally spaced therealong, each feed guide having an upper end 75 for receiving a strand and a depending lower terminal end, or tip, 76, from which one of the multiple strands 69 or 70 is delivered.

Figure 4:
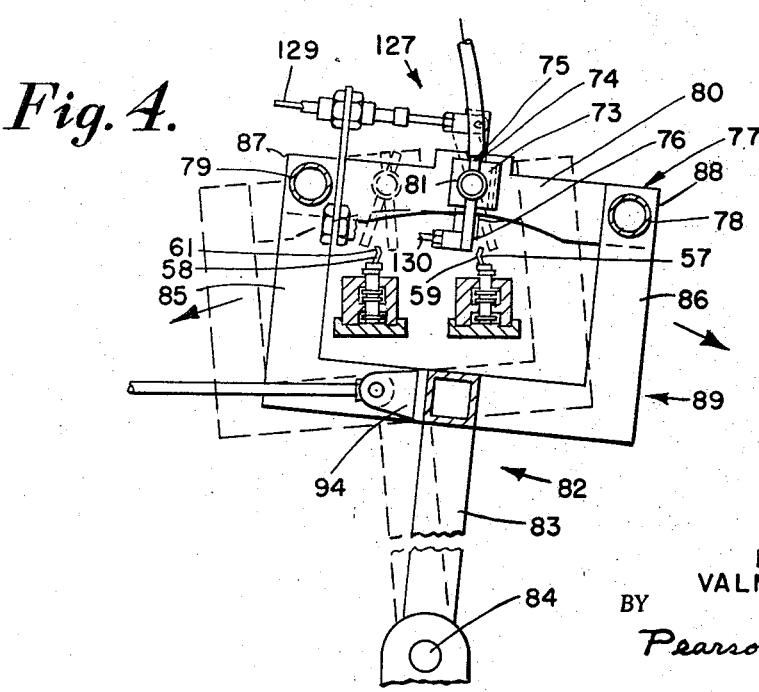
FIGURE 4 is an enlarged diagrammatic end elevation, similar to FIGURE 3, showing the path of the guide tubes of the apparatus.
Figure 5:
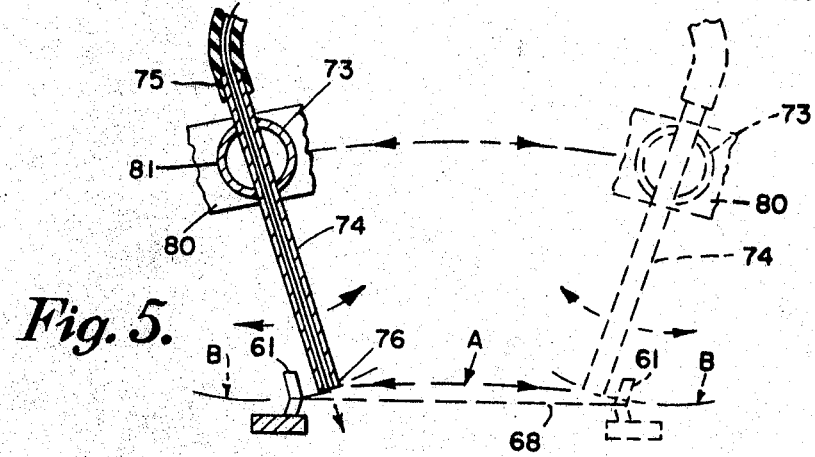
FIGURES 5, 6 and 7 are further enlarged diagrammatic views of the path of the guide tubes.
Figure 6:
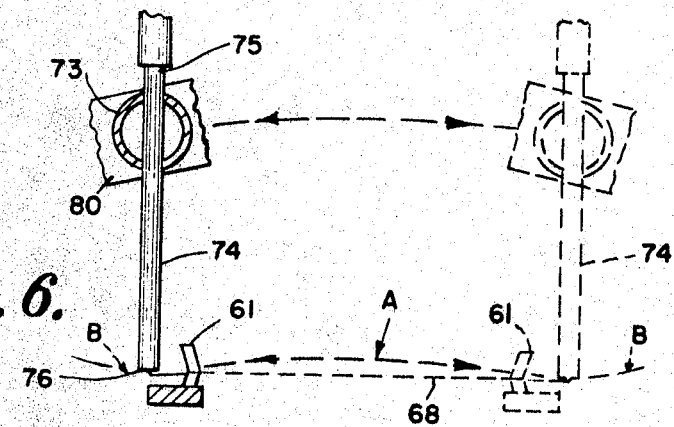
Figure 7:
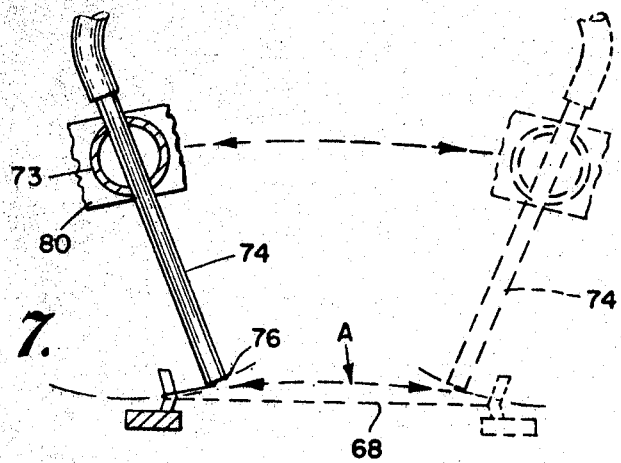

Looping mechanism 72 also includes a carriage 77, formed by a pair of parallel, longitudinally extending rods 78 and 79, rigidly connected by laterally extending cross braces 80 to form a unitary rigidified frame. The guide support 73 extends along the longitudinal centre line of carriage 77, parallel to the rods 78 and 79, and both the support and rods are preferably of relatively light hollow tubular metal to reduce the inertia thereof to a minimum. The guide support 73 is mounted in suitable bearings in the cross braces 80 to freely turn about its axis, such turning swinging the lower ends 76 of the feed guides in an arcuate path about the upper longitudinal axis. 81. (FIGURE 4).

Looping mechanism 72 also includes a bifurcated cradle element 82, having a base portion 83, pivoted to machine 30, below the level of the paths of the rows of pins advancing along the stretches 44 and 45, and mounted to pivot on a lower, longitudinal axis, designated 84, located centrally thereof and in parallelism therewith. Cradle element 82 includes a pair of branch portions 85 and 86, each extending upwardly from the base portion 83 on the outside of the path of the pins to a level thereabove. The upper terminal ends 87 or 88 of the branches 85 and 86 slidably receive the rods 78 or 79 of the carriage 77 in suitable bearings. Thus the looping member 89, formed by the cradle 82 and carriage 77 is movable laterally as a unit, while the carriage 77 is movable longitudinally relative to the cradle. The guide support moves with the carriage, but is also movable laterally independently of the carriage.

Figure 2:
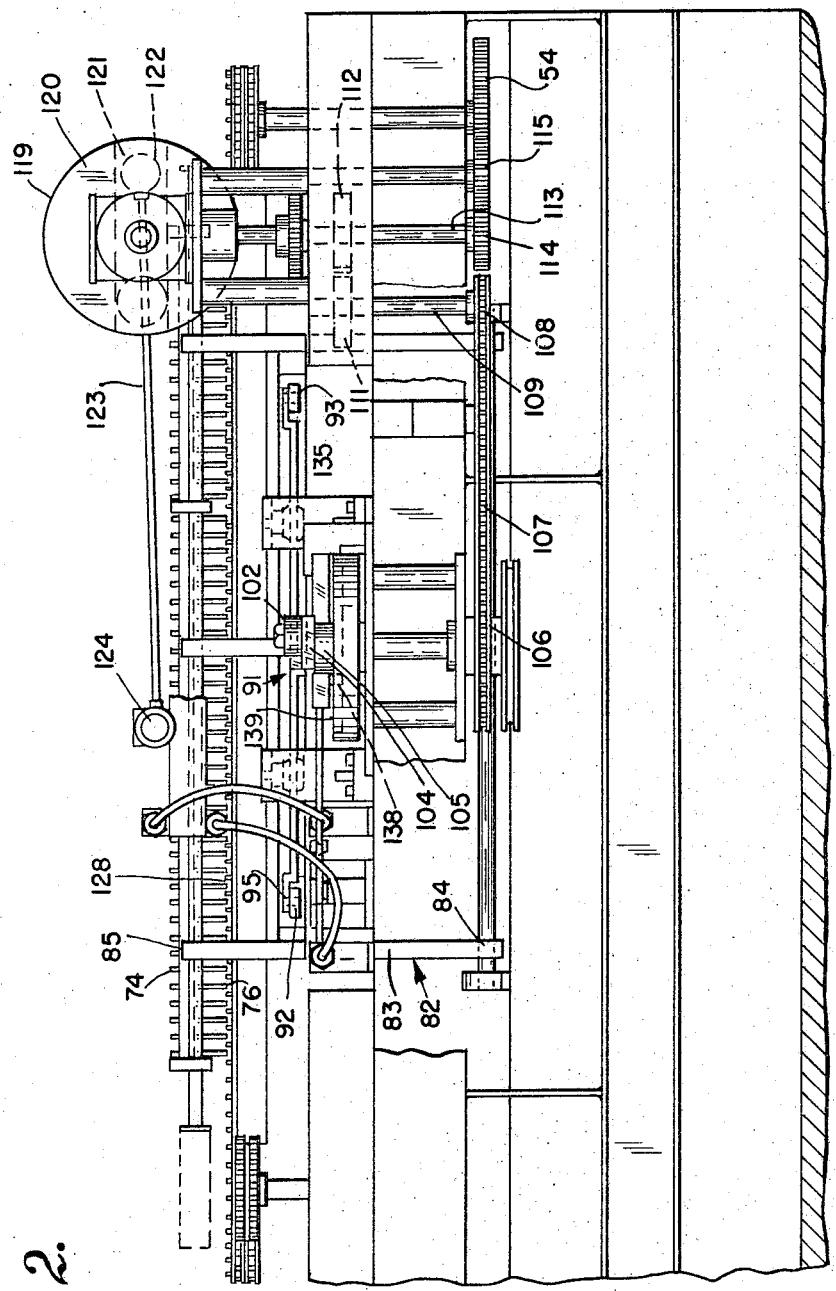
FIGURE 2 is a side elevation of the apparatus shown in FIGURE 1, with parts broken away for clarity.

Means 91, for traversing the looping member 89 laterally, includes the connecting rods 92 and 93, each pivotally connected at 94 to cradle 82, and each pivotally connected at the other end 95 to one end of one of a pair of levers 96 or 97. The levers 96 and 97 are pivoted to machine 30 at 98 and 99 respectively, and jointly pivoted at 102 to a link 103, connected to crank arm 104, rotating on a shaft 105. Thus, with each revolution of shaft 105 and crank arm 104, the looping member 89 is pivoted laterally back and forth through a stroke of predetermined width, with a slight dwell at each opposite side of the stroke as an inherent characteristic of the operation of the crank arm. Shaft 105 (FIGURE 2) is turned by a sprocket 106, chain 107, and sprocket 108, the latter being fast to a vertical shaft 109 turned by intermeshed gears 111 and 112, and by vertical shaft 113. Gear 114, fast to shaft 113, meshes with intermediate gear 115, and gear 115 meshes with gear 54, thereby synchronizing the oscillation of the looping member with the speed of advance of the endless pin carrier chains.

Means 118 for moving the carriage 77 and guide support 73 longitudinally to advance the feed guides alongside the advancing pins at each side of the stroke of the cradle, includes a crank, or crank wheel, 119, having a face 120 with a diametrical groove 121 therein. A ball joint block 122 is slidable in groove 121 to selected positions determining the length of the stroke, and lockable in such positions by suitable set screws or the like at the desired distance from the centre of rotation of the crank. Ball joint block 122 is connected by a ball joint connecting rod, or crank arm, 123, to a ball joint element 124 fixed to carriage 77, so that the carriage moves longitudinally back and forth during the lateral movement of the cradle.

Means 127 for moving the lower depending ends 76 of the feed guides 74 laterally, out through the spaces 128 between the pins and back again, while advancing therewith, includes a flexible cable, or Bowden wire 129, having a terminal end attached to support 73 above axis 81, and a second similar cable 130 having a terminal end attached to support 73 below axis 81. Cables 129 and 130 are each attached to an opposite end of a lever 131, pivoted centrally at 132 to machine 30. Lever 131, is connected by pivoted link 133 to one end 134 of a telescopable link 135, the latter being pivoted at its other end 136 to machine 30. Two cables 129 and 130 are used to assure that the actuation of the support 73 is by pull rather than by push. A roller cam follower 137 mounted under link 135 travels in a cam groove, or track, 138, in a rotary face cam 139, fast to shaft 105, there being two opposite cam track positions 140 and 141, each arranged to move the guide support out and back between the pins during the opposite dwells of the cradle.

As shown diagrammatically in FIGURES 4–7, it will thus be seen that, in operation, the cradle 82, carriage 77, support 73, and guide tubes 74 will be traversed laterally back and forth so that the depending ends 76 of the tubes define a preferably arcuate, primary path, or stroke, of predetermined width designated A from just inside one row of advancing pins to just inside the other row of advancing pins. The primary, or first, curvilinear stroke is above the level of the netting 68 already formed on the pins in the centre of the stroke, but is well below the level, or plane, of the tips 61 of the pins at each opposite end, or side, of the stroke. As the cradle passes the longitudinal centre line between the opposite rows of pins, the carriage 77 commences to advance with the pins so that when the guides are proximate a row of pins they are advancing at substantially the same speed. At this time the guide support is turned rapidly on its axis to swing the lower ends of the guides outwardly through the spaces 128 between pins, loop the strands around the pins and return through the next successive series of spaces. The lower ends 76 define a second curvilinear stroke of predetermined width, in extension of the first stroke, designated B, which secondary stroke, or path, is below the level, or plane, of the tips of the pins, and mainly proximate the level of the bases of the pins. In this invention, the strands do not have to pass over the tips of the pins to be looped therearound, because, once the tubes have moved a strand outwardly through the spaces between pins, the timing is such that the pins advance relative to the tubes, to permit the tubes to pass back inwardly through the next set of spaces. Looping is therefore not only positive, but accomplished with minimum impact and strain on the strands. After looping, the carriage retracts rearwardly as the cradle moves toward the opposite row of pins until the carriage is at normal retracted position at the longitudinal centre line. Upon passing the centre line, the carriage again commences to advance, with the pins it is approaching, as described above, so that the secondary looping stroke takes place with the tubes and pins advancing at substantially the same speed.

The looping mechanism of the invention may have ten to one thousand feed guide tubes 74, each supplied with a strand 143 supplied from a suitable package so that, for example, eighty-four individual strands are simultaneously looped first on one row of advancing pins and then on the opposite advancing row of pins. The pull on such strands during looping, plus the pull caused by the continuously advancing pins, plus the additional pull caused by the divergent stretches 46 and 47 in the network spreading zone 32 places considerable tension on the strands. In this invention, therefore, each strand 143 is enclosed in a tubular conduit, such as 144, 145, or 146, leading from the supply packages 147, 148, or 149, past the guides 150 and 151 and to the upper ends 75 of the guide tubes. The conduits such as 144 are of flexible material such as rubber, nylon, plastic, or the like, guided, at least in the vicinity of the guide support, to permit free oscillation thereof. Thus each strand is preferably supported and guided within a closed tube from the terminal ends 76 of the tubes back to the supply package. At the frame, or creel, supporting the supply packages, or proximate thereto, a source of positive air pressure 156, which may be mill air pressure, or a suitable air pump assembly, is connected near the mouth of each tube by suitable air tubes, 152, 153, 154, to pneumatically feed, and advance, the strand through the tube. Preferably each air tube is connected to each conduit at an angle, as shown. If desired, the pneumatic feed means 155, could be by negative air pressure, by connecting a suitable source of suction to the conduits 144, 145 or 146, near the delivery ends of the tubes, or the positive air pressure could be applied intermediate of the conduits or near the delivery ends of the tubes. In any case, the pneumatic feed means counteracts the tension exerted on the strands to thereby avoid breakage thereof, and permits the use of higher speed, additional guide tubes and increased spreading of the netting after formation.

Figure 3:
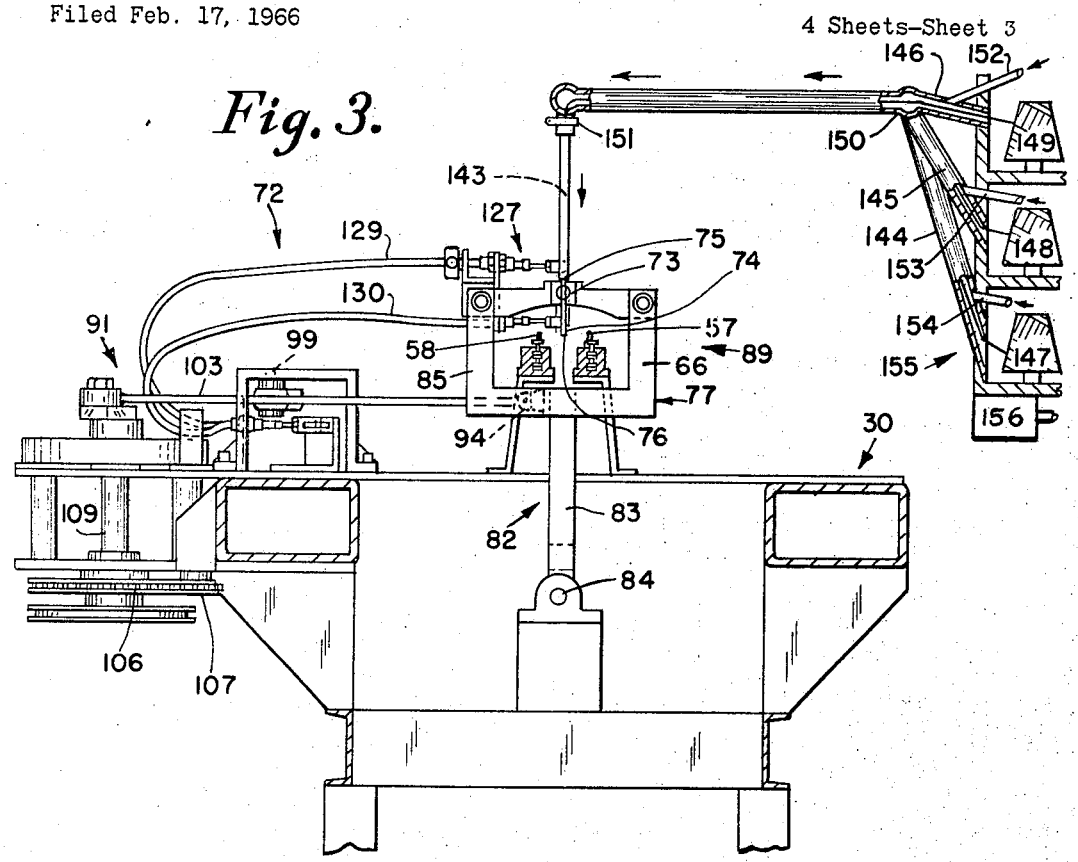
FIGURE 3 is an end elevation in section on line 3—3 of FIGURE 1.

As shown in FIGURE 3, the guide 151 encircles each conduit 144, 145 and 146 to permit the above mentioned free oscillation thereof in the vicinity of the laterally and longitudinally moving guide support. It will be understood that the flexible conduits attached to the feed guide tubes must flex to permit the tips of the guides to travel back and forth laterally for say ten inches, to pivot, or flip through the pins for say two inches and to travel back and forth longitudinally for say eighteen inches, thus subjecting the portions thereof near guide 151, to continual flexure, fatigue and liability to breakage, if anchored thereto.

It will also be understood that the counterbalancing of the extraction tension on the strands by entraining the strands in fluid currents continuously moving in the direction of the extraction forces not only tends to reduce tension and breakage but also tends to continuously free the conduits and guide tubes of lint, fibre dust and the like while reducing friction in the guides. The continuous ejection of air from the terminal tips of the guide tubes does not adversely affect looping, due to the high speed, short stroke mechanical action of the looping mechanism but is advantageous in preventing the strands from clinging to the tube tips because of static electricity.

What is claimed is:
1. In a netting machine of the type having laterally spaced, pin-carrier mechanism continuously advancing along a longitudinal path through a looping zone for supporting the longitudinal edges of a netting; multiple strand looping mechanism in said zone continuously traversing said lateral space to loop said strands around the pins of said carrier mechanism for forming a criss-cross, non-woven, open-meshed netting thereon and strand supply means, supplying multiple strands to said looping mechanism; the combination of:
   improved multiple strand looping mechanism, said mechanism comprising
   a guide support extending longitudinally, in parallelism, with said path, said support having a plurality of individual strand feed guides spaced therealong for receiving strands from said supply means and guiding the same onto the pins of said carrier mechanism;
   a looping member movably mounted on said machine in said zone, said member supporting said guide support for movement therewith;
   means for traversing said member laterally relative to said path, to move said guide support in a stroke of predetermined width from one side of said pin-carrier mechanism to the other;
   means for moving at least said guide support longitudinally relative to said path to move said guides back and forth in a stroke of predetermined length;
   means mounting said guide support on said looping member for relative lateral movement of the guides thereon;
   and means for moving said last named means to cause said guides to pass between, loop around, and pass back between the pins on each opposite side of said path for wrapping said strands therearound.

2. A netting machine as specified in claim 1, wherein said looping member is a bifurcated cradle element having a central base portion pivotable on a longitudinal axis below said path, two branch portions, each extending upwardly outside said path, and a carriage, longitudinally slidable in the said branch portions, above the level of said path;
   and said guide support is mounted on said carriage, centrally of said cradle element;
   whereby said carriage and guide support are traversable with said cradle element, but are slidable longitudinally independently thereof.

3. A netting machine as specified in claim 1, wherein said looping member is a bifurcated cradle pivoted below said path, extending above said path, outside said pin-carrier mechanism, and mounting said guide support above said path for traverse in a first curvilinear stroke of predetermined width from proximate the pins on one side of said carrier mechanism to proximate the pins on the other side of said mechanism;
   and said means mounting said guide support on said looping member is longitudinal pivot means guiding said guides in a second curvilinear stroke, of predetermined width, in extension of said first stroke, at each opposite end of said first stroke;
   whereby said guides pass between, loop around, and pass back between the pins on each opposite side of said path during the said second curvilinear strokes.

4. A netting machine as specified in claim 1, wherein said looping member includes a bifurcated cradle pivoted below said path on a lower longitudinal axis and supporting a carriage above said path, said carriage is longitudinally slidable on said cradle and supports said guide support along the longitudinal centre line thereof, and said guide support is pivotable about an upper longitudinal axis on said carriage;

whereby the guides on said guide support define a compound curvilinear path in traversing said pin-carrier mechanism, said path constituting a main, partly circular arc of predetermined width, and a pair of secondary partly circular arc of predetermined width, at each opposite end thereof, said secondary arcs being entirely below the level of the tips of said pins.

5. A netting machine as specified in claim 4, wherein said means for traversing said member comprises crank and crank arm mechanism operably connected to said cradle said mechanism providing a dwell at each opposite end of the stroke thereof;

and said means for moving said guide support comprises cam and cam follower means operably connected by flexible cable means to said guide support;

the cam and crank of said means being synchronized to cause lateral movement of said guides during each dwell of said cradle at an opposite side of said path.

6. Improved multiple strand looping mechanism for traversing a plurality of strand guides laterally across a path between one longitudinally advancing row of upstanding pins and another longitudinally advancing row of upstanding pins to form a criss-cross, non-woven netting on said pins, said mechanism comprising;

a strand looping member including an element pivotable on a lower longitudinal axis below said path between said rows of pins and extending upwardly therefrom outside, and laterally spaced from, said path, to proximate the level of said pins;

a carriage longitudinally movable on said looping member, said carriage extending laterally from outside to inside said path and being pivotable with said member in an arcuate plane on said lower longitudinal axis;

a guide support extending longitudinally of said carriage, and pivotable on an upper longitudinal axis relative thereto, said support having said guides spaced therealong and depending therefrom, and the lower ends of said guides being pivotable relative to said carriage in an arcuate plane on said upper longitudinal axis;

means for pivoting said looping member, carriage and guide support on said lower longitudinal axis to traverse the lower ends of said guides in a first arcuate stroke from proximate one row of pins to proximate the other;

means for longitudinally advancing and retracting said carriage and guide support on said looping member to advance the tubes on said support, at predetermined speed relative to the speed of the pins, at each opposite end of said stroke;

and means for pivoting said guide support on said upper longitudinal axis, at each opposite end of said first stroke to pivot the lower ends of said guides in a second arcuate stroke within the plane of said pins, and thereby pass said strands through and around said pins for looping therearound.

7. An improved looping mechanism as specified in claim 6, wherein said strand looping member is a bifurcated cradle element having a pair of branch portions, each extending upwardly on an outside of said path between said pins to a level thereabove, and said carriage comprises a frame extending transversely above said path from one said branch portion to the other, and said guide support is pivotally mounted along the longitudinal centre line of said carriage.

8. An improved looping mechanism as specified in claim 6, wherein said means for longitudinally advancing and retracting said carriage includes a crank having a face with a diametrical groove therein, a ball joint block slidably adjustable in said groove to a selected distance from the centre of rotation of said crank, and a crank arm having one end connected to said ball joint block, and the other end connected to said carriage, whereby the longitudinal stroke of said carriage is adjustable in length.

9. An improved looping mechanism as specified in claim 6, wherein said means for pivoting said guide support on said upper longitudinal axis includes cam and cam follower means operably connected to a pair of flexible cables, one said cable having a terminal end attached to said guide support above said upper longitudinal axis and the other said cable having a terminal end attached to said guide support below said upper longitudinal axis, whereby said guide support is positively pivoted successively in opposite angular directions by a pull of one cable or the other at each opposite end of said first arcuate stroke.

10. A method for traversing a plurality of longitudinally spaced strand guides, each depending normal from a guide support, across a path defined by a pair of longitudinally advancing rows of upstanding pins for forming a non-woven, criss-cross netting on said pins, said method comprising the steps of moving said guide support laterally across said path with the lower ends of said guides defining a first curvilinear path which is below the level of the tips of said pins, and just inside the same, at each opposite end, and which is spaced substantially above the level of the tips of said pins at the centre thereof;

while said strand guides are at each end of said curvilinear path, advancing said guides at predetermined speed relative to the speed of advance of the pins at said end of the path, sufficient to permit said guides to pass between said pins on one side thereof, and return on the other side thereof, and while said guides are so advancing with said pins moving the lower ends thereof laterally outwardly through the spaces on one side of said pins to define a second curvilinear path in extension of said first curvilinear path, said second curvilinear path being entirely below the level of the tips of said pins just inside and just outside said pins and then moving said lower ends inwardly through the spaces on the other side of said pins along said second curvilinear path, whereby the strands carried by said guides are positively looped around said pins, well below the level of the tips thereof, while the lower ends of said guides are moving inwardly and upwardly away from the netting being formed on said pins.

11. A method for traversing a plurality of longitudinally spaced strand guides, each depending normal from a guide support and each having a flexible conduit guiding strand thereinto, across a path defined by a pair of laterally spaced, longitudinally advancing rows of upstanding pins for simultaneously drawing a plurality of strands from strand supply means and alternately looping the same on said pins to form a non-woven, criss-cross netting thereon, said method comprising the steps of traversing said guide support and guides laterally in a stroke of predetermined width from one row of pins to the other;

advancing said guide support and guides longitudinally proximate each opposite end of said stroke with, and at substantially the same speed as, the adjacent row of pins, and retracting said guide support and pins centrally of each stroke;

moving the lower ends of said guides through the spaces between the pins of the adjacent row of pins, at each opposite end of said stroke, and moving said ends back through the next successive spaces between said pins, while said guides are advancing therewith, said steps looping said strands in criss-cross fashion around said advancing pins and progressively drawing said strands from said strand supply means under varying tensions and, during the simultaneous drawing of said plurality of strands from said strand supply means through said flexible conduits;

guiding said flexible conduits, at least in the vicinity of said guide support, for free oscillation thereof to avoid excessive flexural wear and fatigue thereof.

12. A method as specified in claim 11, plus the step of continuously, during said strand drawing steps and conduit guiding steps, entraining each strand being drawn through said guide tubes and strand conduits in a current of air travelling in the direction of the extraction forces on said strands, thereby reducing strand tension, breakage and friction while continuously clearing said guide tubes of foreign material.

13. A method for making a criss-cross, non-woven netting on a pair of laterally spaced, longitudinally advancing rows of upstanding pins, by means of flexible strand guide conduits, said method comprising the steps of traversing a plurality of strands from one said row to the other and looping said strands first around the pins of one row and then around the pins of the other row, while drawing said strands through said flexible conduits from said strand supply, spreading said rows apart, after said looping step to widen the netting looped on said pins, while further drawing said strands through said flexible conduits from said strand supply, and continuously blowing said strands, with a predetermined force, through said flexible conduits in the direction of said draft thereon during said traversing, looping and spreading steps to relieve the draft tension thereon and thereby reduce strand breakage.

14. In a criss-cross netting machine of the character described, the combination of strand supply means for supplying a multiplicity of individual strands;

netting carrier means including a pair of laterally spaced, longitudinally advancing rows of upstanding pins adapted to support a netting therebetween, said advancing pins continually drawing said strands from said strand supply means, laterally moving looping mechanism, operable between said rows of pins, for looping said strands first on one row of said pins and then on the other to form a criss-cross netting thereon, netting widening means on said machine including mechanism in rear of said looping mechanism spreading said rows of pins, to draw said strands around said pins, back through said looping mechanism to said strand supply means for increasing the width of said netting, and strand support and guide means including a plurality of flexible tubular conduits, each enclosing one of said strands, and a conduit guide on said machine in advance of said looping mechanism, said flexible conduits being mounted for free oscillation relative to said guide;

and stationary pneumatic strand feed means, connecting each said flexible conduit to a source of air pressure for continuously blowing the strand therein in the direction of draft exerted by said advancing pins for reducing the draft tension on said strands.

15. In a netting machine of the type having a pair of laterally spaced rows of longitudinally spaced loop receiving elements advancing along a path through a looping zone and a plurality of longitudinally spaced strand guides traversing laterally of said path to alternately loop a plurality of strands first on one said advancing row and then on the other said advancing row, the combination of means for traversing said strand guides on a lateral stroke of predetermined width, means. cooperable with said first named means, for reciprocating said strand guides on a longitudinal stroke of predetermined length to advance along with each said row proximate one end of each said lateral stroke and to retract centrally of each said lateral stroke, and means, cooperable with both of the above said means, for moving the terminal tips of said strand guides laterally, at each opposite end of each said lateral stroke, to pass outwardly between, and then pass inwardly between, said loop receiving elements to loop said strands therearound.

References Cited
UNITED STATES PATENTS

| | | | |
|---|---|---|---|
| 1,192,568 | 6/1916 | Scherf | 156—436 |
| 2,614,054 | 11/1949 | Baisch et al. | 156—439 X |
| 2,732,885 | 1/1956 | VanDer Hoven | 156—511 X |
| 2,812,797 | 11/1957 | Estee et al. | 156—440 |
| 2,962,080 | 11/1960 | Hirsch | 156—440 |

EARL M. BERGERT, *Primary Examiner.*

J. P. MELOCHE, *Assistant Examiner.*